(12) United States Patent
Kikuchi et al.

(10) Patent No.: US 9,360,666 B2
(45) Date of Patent: Jun. 7, 2016

(54) PLASTICS OPTICAL COMPONENT AND METHOD FOR MANUFACTURING THE SAME

(71) Applicant: CANON KABUSHIKI KAISHA, Tokyo (JP)

(72) Inventors: Wataru Kikuchi, Warabi (JP); Daigo Kobayashi, Tokyo (JP); Yuichi Miyoshi, Ushiku (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 13/898,274

(22) Filed: May 20, 2013

(65) Prior Publication Data

US 2013/0316144 A1 Nov. 28, 2013

(30) Foreign Application Priority Data

May 23, 2012 (JP) .................................. 2012-117751
Apr. 24, 2013 (JP) .................................. 2013-091425

(51) Int. Cl.

| | |
|---|---|
| *G02B 27/00* | (2006.01) |
| *B29D 11/00* | (2006.01) |
| *B29C 45/16* | (2006.01) |
| *G02B 1/04* | (2006.01) |
| *B29K 33/00* | (2006.01) |
| *B29C 45/27* | (2006.01) |

(52) U.S. Cl.
CPC ............... *G02B 27/00* (2013.01); *B29C 45/16* (2013.01); *B29D 11/00048* (2013.01); *B29D 11/0073* (2013.01); *G02B 1/041* (2013.01); *B29C 45/2708* (2013.01); *B29K 2033/12* (2013.01); *B29K 2995/007* (2013.01); *B29K 2995/0069* (2013.01); *Y10T 428/24521* (2015.01); *Y10T 428/24983* (2015.01)

(58) Field of Classification Search
None
See application file for complete search history.

(56) References Cited

U.S. PATENT DOCUMENTS

| | | | |
|---|---|---|---|
| 4,785,053 A | 11/1988 | Ito et al. | |
| 5,523,030 A * | 6/1996 | Kingsbury | .................... 264/1.7 |
| 6,144,500 A * | 11/2000 | Iwaki et al. | ................... 359/719 |
| 6,327,415 B1 | 12/2001 | Koyano et al. | |
| 6,466,376 B1 * | 10/2002 | Koshimizu | .......... B29C 45/0055 |
| | | | 359/642 |
| 8,947,795 B2 | 2/2015 | Kobayashi et al. | |
| 8,964,313 B2 | 2/2015 | Kobayashi et al. | |
| 2002/0050658 A1* | 5/2002 | Richard | ...................... 264/1.32 |

(Continued)

FOREIGN PATENT DOCUMENTS

| | | |
|---|---|---|
| CN | 103238088 A | 8/2013 |
| DE | 102008034153 A1 | 1/2010 |

(Continued)

OTHER PUBLICATIONS

[NPL #1] Kutz, M., "Mechanical Engineers' Handbook: Materials and Engineering Mechanics"; John Wiley & Sons, Inc., vol. 1, Ed. 4 (2015), pp. 366.*

(Continued)

*Primary Examiner* — David Sample
*Assistant Examiner* — Donald M Flores, Jr.
(74) *Attorney, Agent, or Firm* — Canon USA, Inc., IP Division

(57) ABSTRACT

A plastic optical component includes a base member made of a first plastic, and a covering member disposed over a surface of the plastic member. The covering member is made of a second plastic. The water absorption of the first plastic is lower than the water absorption of the second plastic.

22 Claims, 11 Drawing Sheets

(56) References Cited

U.S. PATENT DOCUMENTS

| | | |
|---|---|---|
| 2007/0160831 A1 | 7/2007 | Hsieh et al. |
| 2008/0100921 A1 | 5/2008 | Nishikawa et al. |
| 2010/0130638 A1 * | 5/2010 | Hanaki .................. C08K 5/45 523/137 |

FOREIGN PATENT DOCUMENTS

| | | | | |
|---|---|---|---|---|
| DE | 102008034153 A1 * | 1/2010 | ............ | B29D 11/00 |
| EP | 2402140 A1 | 1/2012 | | |
| EP | 2666619 A1 | 11/2013 | | |
| JP | S57-72822 A | 5/1982 | | |
| JP | S60-054822 A | 3/1985 | | |
| JP | 60-097301 A | 5/1985 | | |
| JP | 63-315216 A | 12/1988 | | |
| JP | H04-185105 A | 7/1992 | | |
| JP | H06-335939 A | 12/1994 | | |
| JP | 8-187793 A | 7/1996 | | |
| JP | H08-190004 A | 7/1996 | | |
| WO | 2012/070456 A1 | 3/2012 | | |
| WO | WO2012041639 A1 * | 4/2012 | ............ | H01L 33/58 |

OTHER PUBLICATIONS

[NPL #2] Nidek Co., Ltd. "Highly functional hard coated plastic sheet"; (May 13, 2012), <http://www.nidek-intl.com/products/coating_others/geolass.html>.*

[NPL #3] "Polycarbonate of bisphenol A (PC)"; Gallina Usa (2013), <http://gallinausa.com/wp-content/uploads/2013/01/Polycarbonate.Bisphenol.A.pdf>.*

Giessauf et al. (DE102008034153A1) [English—Machine Translation; from Google Patents], (Jan. 29, 2010).*

PCT/JP2011/076470, "PCT Notification of Transmittal of the International Search Report", Mar. 6, 2012, pp. 1-5.

PCT/JP2011/076470, "PCT Written Opinion of the International Searching Authority", Mar. 6, 2012, pp. 1-4.

* cited by examiner

FIG. 5A
FIG. 5B
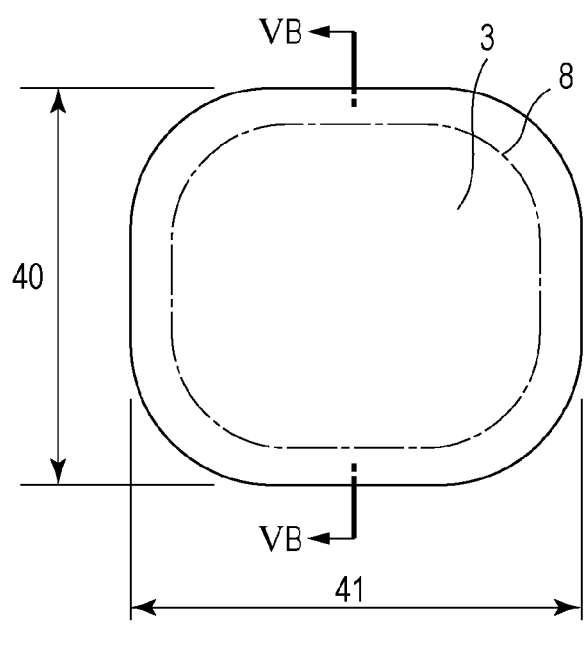
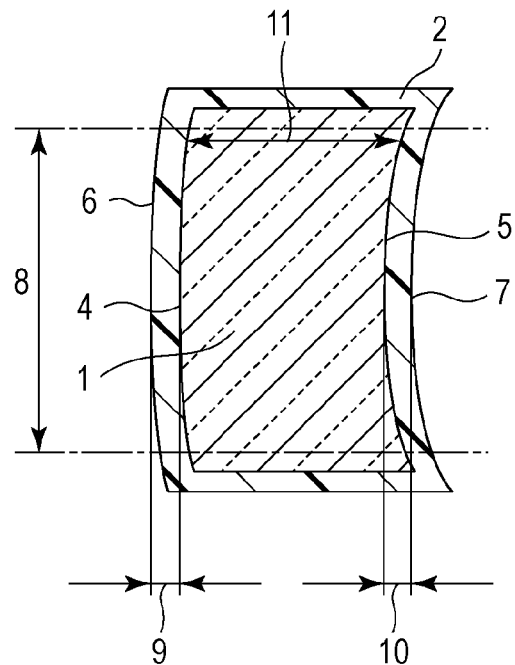

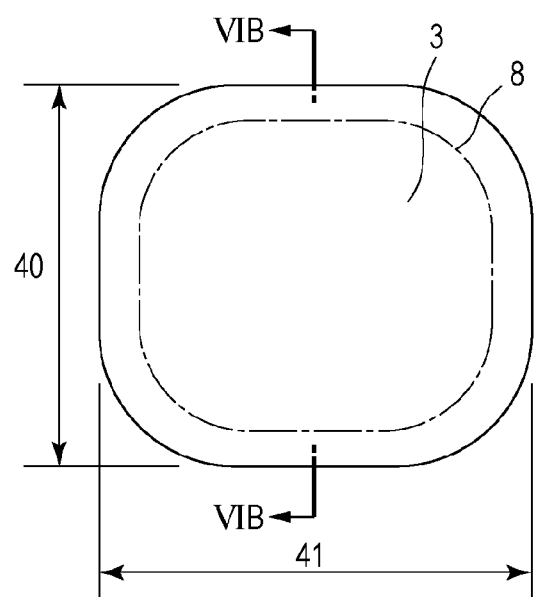
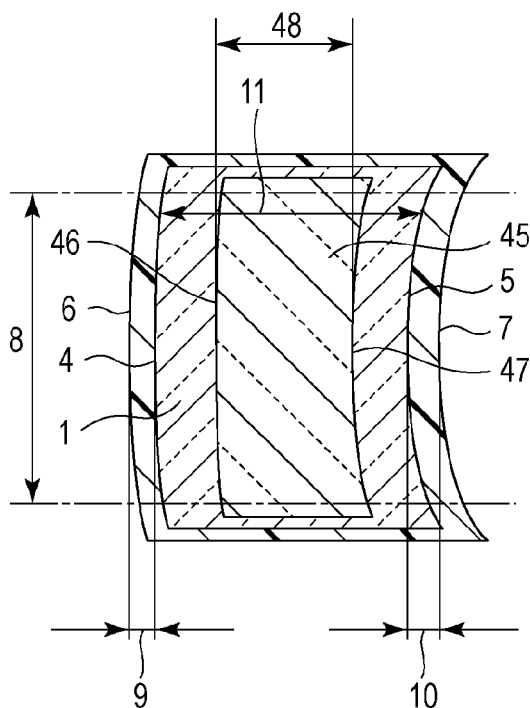

PLASTICS OPTICAL COMPONENT AND METHOD FOR MANUFACTURING THE SAME

BACKGROUND OF THE INVENTION

1. Field of the Invention

The present invention relates to a plastic optical component used in optical apparatuses such as digital cameras and copy machines, and to a method for manufacturing the plastic optical component.

2. Description of the Related Art

There is a growing demand for the manufacture of thick optical components by an injection molding process. However, as the thickness of an optical component is increased, a difference in curing shrinkage occurs between the surface plastic layer that is first cured in the molding process and the inner plastic portion that is cured later and thus stress is increased in the optical component. This undesirably causes voids to be formed within the optical component or the internal stress to remain. The time for cooling such a thick optical component in a die is sharply increased due to the increase in the thickness of the optical component, and accordingly, the molding cycle increases remarkably.

In order to solve these issues, Japanese Patent Laid-Open No. 8-187793 proposes that a base member be integrated with plastic covering portions so that first and second surfaces of the base member are covered with the covering portions.

A thick plastic optical component must allow for a deformation resulting from the moisture absorption of the plastic thereof, and is accordingly formed of a plastic whose water absorption is low small. Otherwise, the surface of the optical component is likely to be deformed by moisture absorption and, consequently, the focus position may be displaced or other optical properties may be degraded. Unfortunately, the surface hardnesses of low-water-absorption plastics used for injection molding are generally low. Thus, low-water-absorption plastics may not be able to satisfy the abrasion resistance required for use for an exposed portion of a digital camera. In use in a copy machine, a thick plastic optical component may be damaged during manufacture or maintenance. Even the above-cited Japanese Patent Laid-Open No. 8-187793 cannot solve this issue because the base member and the plastic covering member are made of the same material.

SUMMARY OF THE INVENTION

The present invention provides a thick abrasion-resistant plastic optical component that is not much deformed by moisture absorption, and provides a method for manufacturing the plastic optical component.

The plastic optical component includes a base member made of a first plastic, and a covering member disposed over a surface of the base member. The covering member is made of a second plastic. The water absorption of the first plastic is lower than that of the second plastic, and the second plastic has a higher hardness than the first plastic.

The method for manufacturing a plastic optical component includes forming a covering member by feeding a melt of a second plastic onto a surface of a base member placed in a die. The base member is made of a first plastic. The first plastic has a lower water absorption than the second plastic. The second plastic has a higher pencil hardness than the first plastic.

Further features of the present invention will become apparent from the following description of exemplary embodiments with reference to the attached drawings.

BRIEF DESCRIPTION OF THE DRAWINGS

FIGS. 5A and 5B are representations of a plastic optical component prepared in an Example of the present invention.

FIGS. 6A and 6B are representations of a plastic optical component prepared in an Example of the present invention.

DESCRIPTION OF THE EMBODIMENTS

First Embodiment

Figure 1:
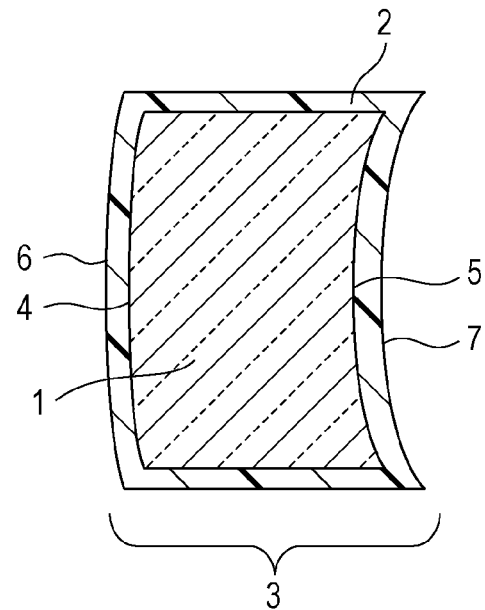
FIG. 1 is a representation of a plastic optical component according to a first embodiment of the present invention.

FIG. 1 is a sectional view of a plastic optical component 3 according to a first embodiment of the present invention. In FIG. 1, the plastic optical component 3 includes a base member 1 made of a first plastic, and a covering member 2 made of a second plastic. The base member 1 has a first surface 4 and a second surface 5. Also, the plastic optical component 3 has a first surface 6 and a second surface 7. The first plastic of the base member 1 has a lower water absorption than the second plastic of the covering member 2. The second plastic has a higher hardness than the first plastic. The base member 1 may be a lens. The hardness of a plastic mentioned herein refers a pencil hardness measured in accordance with JIS K5401, and "a hard plastic" means the plastic has a high pencil hardness. By increasing the hardness of the second plastic, the abrasion resistance of the first and second surfaces 6 and 7 of the plastic optical component 3 is enhanced. By reducing the water absorption of the first plastic, the deformation of the base member 1 resulting from its own moisture absorption is reduced. Deformation resulting from moisture absorption hereinafter may be referred to as moisture deformation. In addition, by covering the first and second surfaces 4 and 5 of the base member 1 with the covering member 2 of the second plastic, moisture deformation caused by the difference in water absorption between the first plastic and the second plastic can be reduced. Thus, a thick, abrasion-resistant plastic optical component that is not much deformed by moisture absorption can be achieved. One of the surfaces 4 and 5 of the base member 1 is a first surface, and the other is a second surface. Either can be the first or second surface without particular limitation. Also, one of the surfaces 6 and 7 of the plastic optical component 3 is a first surface, and the other is a second surface. Either can be the first or second surface without particular limitation. If the base member 1 is a lens, the lens may be a meniscus lens, a double-convex lens, a concave-concave lens, a plano-convex lens, or a plano-concave lens, and the shape of the lens is not particularly limited. Also, the surface of the lens may be spherical, aspherical, or free-form, and the shape of the surface is not particularly limited. The term "pencil hardness" mentioned herein is a value measured in accordance with JIS K5401. The term "water absorption" mentioned herein is a value determined in accordance with JIS K7209. The first plastic and the second plastic may be transparent. The transparent plastics may be colored without being limited to colorless, and plastics having a visible light transmittance of 80% or more are advantageous.

The first plastic may have a water absorption in the range of 0.01% to 0.2%. The second plastic may have a pencil hardness of 2H or higher. The difference in water absorption is preferably 0.3% or less between the first plastic and the second plastic. By using plastics having these properties, a thick, abrasion-resistant plastic optical component that is less deformed by moisture absorption can be achieved. If the water absorption of the first plastic is higher than 0.2%, the moisture deformation of the base member 1 is likely to increase. Consequently, the surface of the base member 1 is seriously deformed, and the optical properties are degraded. If the pencil hardness of the second plastic is lower than 2H, the surface of the second plastic is easily scratched, and thus the abrasion resistance may not be satisfactory. The first plastic may be a resin containing polycarbonate, a cycloolefin polymer, a copolymer of cycloolefin and α-olefin, styrene, polystyrene, a copolymer of styrene and methyl methacrylate, or fluorene polyester. However, the first plastic is not particularly limited as long as its water absorption is 0.2% or less. The second plastic may be a poly(methyl methacrylate) or hard silicone resin. However, the second plastic is not particularly limited as long as its pencil hardness is 2H or higher. One or more additives that can absorb UV light may be added to the second plastic. Such a plastic optical component is also resistant to UV light even though it is thick. Examples of the additives that can absorb UV light include, but are not limited to, benzotriazole compounds, benzophenone compounds and triazine compounds. The additive content can be such that the additives do not affect the physical properties of the covering member 2, and may be in the range of 0.1 to 5 parts by weight.

The thickness of the covering member 2 is preferably in the range of 0.5 to 3 mm. FIG. 2 shows the structure of the plastic optical component 3. The same parts as in FIG. 1 are designated by the same reference numerals, and thus description thereof is omitted. In FIG. 2, reference numeral 8 designates an optically effective portion of the plastic optical component 3; reference numeral 9 designates a first thickness of the covering member 2 made of the second plastic; reference numeral 10 designates a second thickness of the covering member 2; and reference numeral 11 designates the thickness of the base member 1. In the present embodiment, the first thickness 9 and second thickness 10 of the covering member 2 are each in the range of 0.5 to 3 mm. The plastic optical component is resistant to abrasion and is less deformed by moisture absorption even though it is thick. If the first thickness 9 and second thickness 10 of the covering member 2 are less than 0.5 mm, stress applied when a melt of the second plastic is fed into a die is increased, and thus a sink mark or residual stress may be undesirably increased. In contrast, if the first thickness 9 and second thickness 10 of the covering member 2 are larger than 3 mm, the covering member 2 may be deformed by the moisture absorption of the second plastic.

The first thickness 9 of the covering member 2 refers to the average distance from the first surface 6 of the plastic optical component 3 to the first surface 4 of the base member 1 in the optically effective portion 8. The second thickness 10 of the covering member 2 refers to the average distance from the second surface 7 of the plastic optical component 3 to the second surface 5 of the base member 1 in the optically effective portion 8. The thickness 11 of a base member 1 refers to the maximum thickness thereof in the optically effective portion 8. The first surface 4 of the base member 1 and the first surface 6 of the plastic optical component 3 can be substantially homothetic to each other, and the second surface 5 of the base member 1 and the second surface 7 of the plastic optical component 3 can be substantially homothetic to each other. The first thickness 9 of the covering member 2 (distance between the first surface 6 of the plastic optical component 3 and the first surface 4 of the base member 1 in the optically effective portion 8) desirably does not much vary. Also, the second thickness 10 of the covering member 2 (distance between the second surface 7 of the plastic optical component 3 and the second surface 5 of the base member 1 in the optically effective portion 8) desirably does not much vary. Also, the first thickness 9 of the covering member 2 can be substantially the same as the second thickness 10 of the covering member 2.

A method for manufacturing the plastic optical component of the present embodiment will now be described below. A first and a second plastic are selected such that the second plastic has a higher pencil hardness than the first plastic, and such that the first plastic has a lower water absorption than the second plastic. The base member 1 may be formed of the first plastic by injection molding, extrusion, or pressing. The resulting base member 1 is placed in a mold cavity of an injection die, and the second plastic is fed onto the first and second surfaces 4 and 5 of the base member 1 to cover the base member 1, thus being integrated with the base member 1.

Figure 2A:
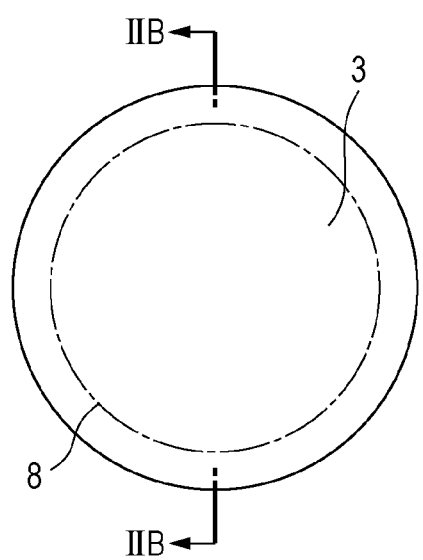
FIGS. 2A and 2B are representations of the plastic optical component of the first embodiment.
Figure 2B:
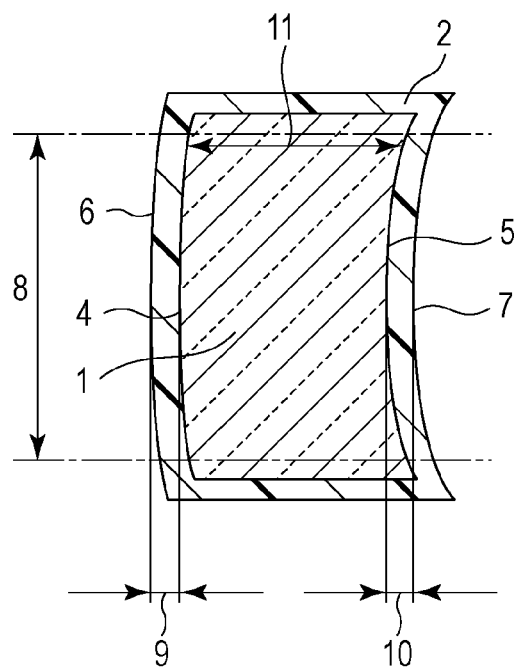
Figure 3A:
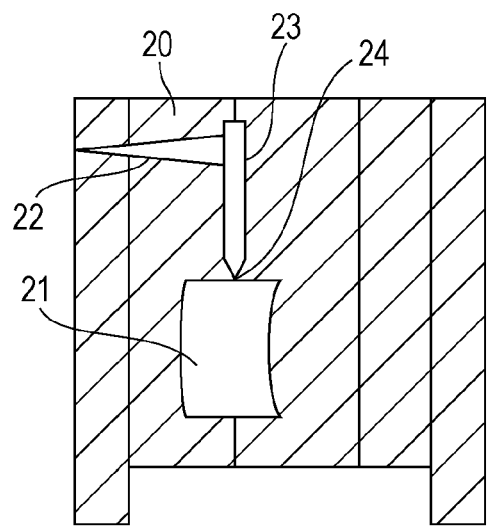
FIGS. 3A to 3D are representations of dies used in the first embodiment.
Figure 3B:
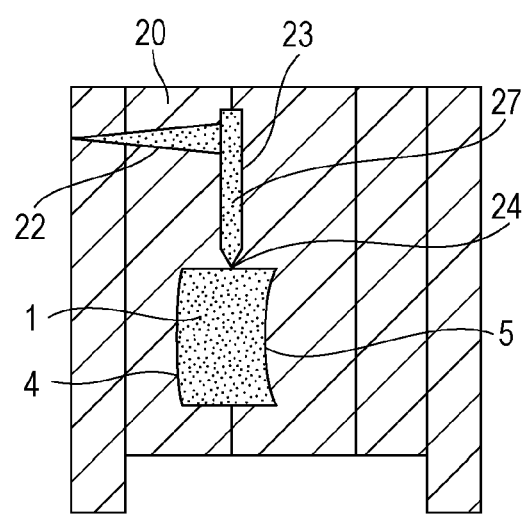
Figure 3C:
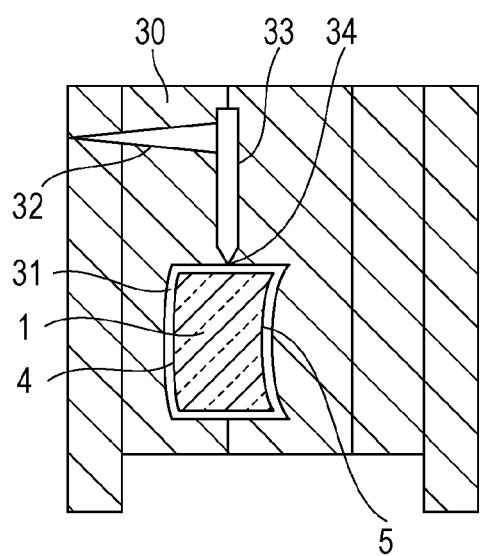
Figure 3D:
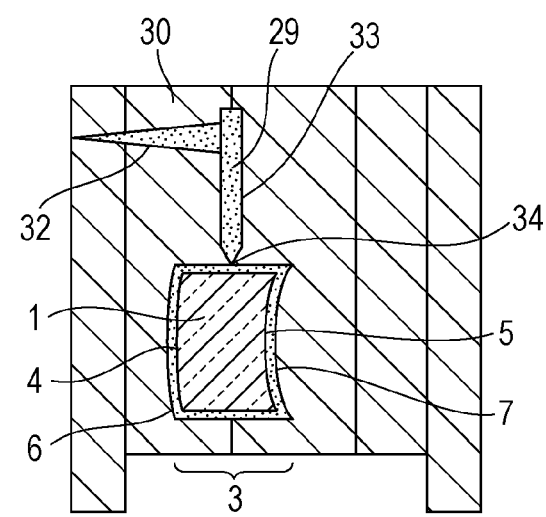
Figure 4A:
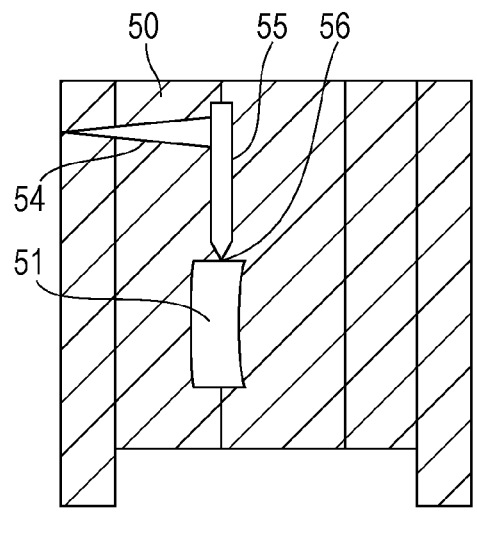
FIGS. 4A to 4D are representations of dies used in the first embodiment.
Figure 4B:
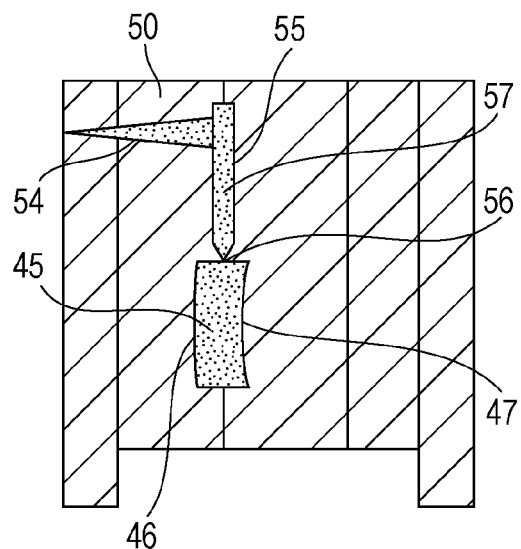
Figure 4C:
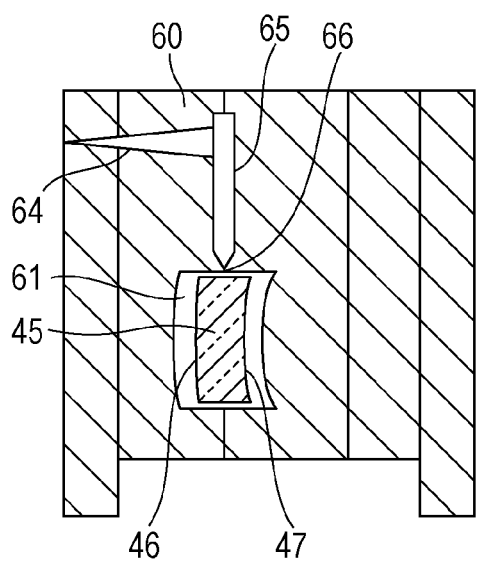
Figure 4D:
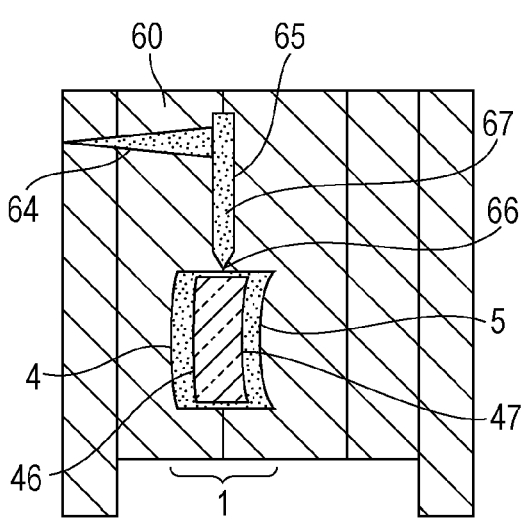

An exemplary process of the method for manufacturing the plastic optical component is shown in FIGS. 3A to 3D. FIGS. 3A to 3D are sectional views of the dies used in the method of the present embodiment. The same parts as in FIGS. 1 and 2A and 2B are designated by the same reference numerals, and thus description thereof is omitted. Reference numeral 20 designates a base member die having a mold cavity 21. Reference numeral 30 designates a plastic optical component die having a mold cavity 31 in which the covering member 2 is formed. In this process, first, the base member 1 is formed by injecting a first plastic 27 having a lower water absorption than the second plastic into the mold cavity 21 of the base member die 20 through a sprue 22, a runner 23, and a gate 24, as shown in FIG. 3B. Then, the resulting base member 1 is inserted into the mold cavity 31 of the plastic optical component die 30, as shown in FIG. 3C. A second plastic 29 having a higher pencil hardness than the first plastic is injected into the mold cavity 31 through a sprue 32, a runner 33, and a gate 34, as shown in FIG. 3D. Thus, the covering member 2 is formed to complete the plastic optical component 3. The plastic optical component 3 is resistant to abrasion and is not much deformed by moisture absorption even though it is thick. In order to increase the adhesion between the base member 1 and the second plastic 29, the first surface 4 and/or the second surface 5 of the base member 1 may be irradiated with a high energy beam. The high energy beam may be, but is not limited to, UV radiation, corona discharge, or plasma discharge. In this process, a base member 1 integrated with a core member may be formed. More specifically, a core member is inserted into the base member die 20, and a first plastic is fed onto a first and a second surface of the core member to cover the core member. The core member and the base member 1 may be lenses integrated together. A process for the formation of such a lens is shown in FIGS. 4A to 4D. FIGS. 4A to 4D are sectional views showing the process for forming the lens used in the present embodiment. The same parts as in FIGS. 1 to 3D are designated by the same reference numerals, and thus description thereof is omitted. In FIGS. 4A to 4D, reference numeral 45 designates a lens that will be enclosed in the base member 1. The lens 45 has a first surface 46 and a second surface 47. The lens 45 is formed with a lens die 50 having a mold cavity 51. Reference numeral 60 designates a base member die having a mold cavity 61. First, the lens 45 is formed by injecting a first plastic 57 into the mold cavity 51 of the lens die 50 through a sprue 54, a runner 55 and a gate 56, as shown in FIG. 4B. The lens 45 is inserted into the mold cavity 61 of the base member die 60, as shown in FIG. 4C. Then, the base member 1 is formed by injecting the first plastic 67 into the mold cavity 61 of the base member die 60 through a sprue 64, a runner 65 and a gate 66. This process can prevent stress from being increased by the difference, which increases as the thickness of the base member 1 is increased, in curing shrinkage between the surface plastic layer that is first cured in the molding process and the inner plastic portion that is cured late.

One of the surfaces 46 and 47 of the lens 45 is a first surface, and the other is a second surface. Either can be the first or second surface without particular limitation. The lens 45 may be a meniscus lens, a double-convex lens, a concave-concave lens, a plano-convex lens, or a plano-concave lens, and the shape of the lens is not particularly limited. Also, the surfaces of the lens 45 may be spherical, aspherical, or free-form, and the shapes of the surfaces are not particularly limited. The surfaces of the base member 1 and the surfaces of the lens 45 can be substantially homothetic to each other. It is advantageous that the distances between the first surface 4 of the base member 1 and the first surface 46 of the lens 45 and between the second surface 5 of the base member 1 and the second surface 47 of the lens 45 are each constant in the optically effective portion.

Second Embodiment

A plastic optical component and a method for manufacturing the optical component will be described according to a second embodiment of the present invention. In the following description, the same parts as in the first embodiment are designated by the same reference numerals, and thus description thereof is omitted. In the second embodiment, the covering member includes a first covering portion and a second covering portion, and either the first covering portion or the second covering portion is made of a third plastic. The first plastic has a lower water absorption than the third plastic.

Figure 7A:
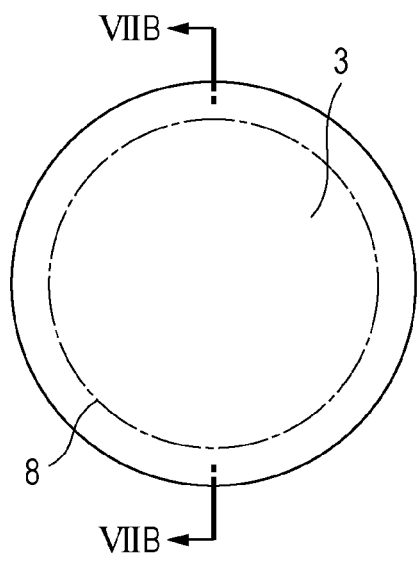
FIGS. 7A and 7B are representations of a plastic optical component according to a second embodiment of the present invention.
Figure 7B:
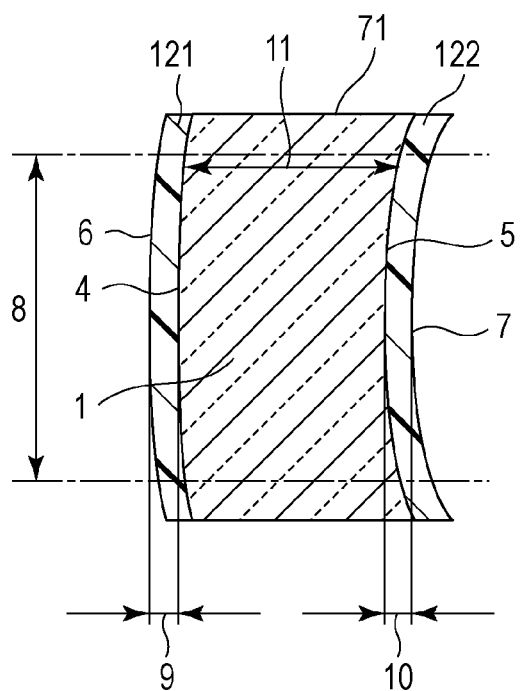

FIGS. 7A and 7B are schematic representations of the plastic optical component of the second embodiment. FIG. 7A is a top view of the plastic optical component, and FIG. 7B is a sectional view of the plastic optical component. The plastic optical component 3 includes a base member 1 made of a first plastic, and a first covering portion 121 made of a second plastic, and a second covering portion 122 made of a third plastic. The base member 1 has a first surface 4 and a second surface 5. Also, the plastic optical component 3 has a first surface 6 and a second surface 7. The base member 1 may be a lens. In the second embodiment, the first plastic of the base member 1 has a lower water absorption than the second and third plastics, and the pencil hardnesses of the second and third plastics are higher than the pencil hardness of the first plastic. The water absorptions of the second plastic and the third plastic can be the same. By reducing the water absorption of the first plastic, the moisture deformation of the base member 1 made of the first plastic can be reduced. By increasing the pencil hardness of the second and third plastics, the abrasion resistance of the first and second surfaces 6 and 7 of the plastic optical component 3 is increased. By setting the water absorption of the second and third plastics to the same value, the plastic optical component 3 is prevented from being bent due to the difference in moisture absorption between these plastics. Also, the side surface 71 of the base member 1 is not covered with the covering member (second plastic or the third plastic). This reduces the moisture deformation of the periphery of the plastic optical component 3. Such a plastic optical component 3 is resistant to abrasion and is not much deformed by moisture absorption even though it is thick. In the plastic optical component 3, one of the surfaces 4 and 5 of the base member 1 is a first surface, and the other is a second surface. Either can be the first or second surface without particular limitation. Also, one of the surfaces 6 and 7 of the plastic optical component 3 is a first surface, and the other is a second surface. Either can be the first or second surface without particular limitation. Similarly, one of the covering portions 121 and 122 is a first covering portion, and the other is a second covering portion. Either can be the first or second covering portion without particular limitation. If the base member 1 is a lens, the lens may be a meniscus lens, a double-convex lens, a concave-concave lens, a plano-convex lens, or a plano-concave lens, and the shape of the lens is not particularly limited. The first, second and third plastics can be transparent. The transparent plastics may be colored without being limited to colorless, and plastics having a visible light transmittance of 80% or more are advantageous.

The water absorption of the base member 1 is preferably in the range of 0.01% to 0.2%, and the second and third plastics preferably have pencil hardnesses of 2H or higher. The differences in water absorption between the first plastic and the second plastic and between the first plastic and the third plastic are preferably 0.3% or less. Such a plastic optical component 3 is resistant to abrasion and is less deformed by moisture absorption even though it is thick. If the water absorption of the base member 1 is higher than 0.2%, the moisture deformation of the base member 1 is increased by its own moisture absorption. If the pencil hardness of the second and third plastics is reduced to lower than 2H, the abrasion resistance of the surface of the plastic optical component is not satisfactory. Examples of the first plastic include polycarbonate, cycloolefin polymer, copolymers of cycloolefin and α-olefin, styrene, polystyrene, copolymers of styrene and methyl methacrylate, and fluorene polyesters. However, the first plastic is not particularly limited as long as its water absorption is 0.2% or less. The second and third plastics may each be a poly(methyl methacrylate) or hard silicone resin. However, the second and third plastics are not particularly limited as long as their pencil hardnesses are 2H or higher. The second plastic and the third plastic can be the same material. One or more additives that can absorb UV light may be added to the second and third plastics of the second and third covering portions 121 and 122. Such a plastic optical component 3 is also resistant to UV light even though it is thick. Examples of the additives that can absorb UV light include, but are not limited to, benzotriazole compounds, benzophenone compounds and triazine compounds. The additive content can be such that the additives do not affect the physical properties of the second and third plastics, and may be in the range of 0.1 to 5 parts by weight.

The thicknesses of the covering portions 121 and 122 are preferably in the range of 0.5 to 3 mm. In FIGS. 7A and 7B, reference numeral 8 designates an optically effective portion of the plastic optical component 3; reference numeral 9 designates the thickness of the first covering portion 121 made of the second plastic; reference numeral 10 designates the thickness of the second covering portion 122 made of the third plastic; and reference numeral 11 designates the thickness of the base member 1. In the present embodiment, the thickness 9 of the first covering portion 121 and the thickness 10 of the second covering portion 122 are each in the range of 0.5 to 3 mm. Such a plastic optical component 3 is resistant to abrasion and is less deformed by moisture absorption even though it is thick. If the thicknesses 9 and 10 of the first and second covering portions 121 and 122 are smaller than 0.5 mm, stress applied when a melt of the second or third plastic is fed into a die is increased. Consequently, a sink mark or residual stress may be undesirably increased. In contrast, if the thicknesses 9 and 10 of the first and second covering portions 121 and 122 are larger than 3 mm, the first covering portion 121 or the second covering portion 122 may be deformed by the moisture absorption of the second or the third plastic. The thickness 9 of the first covering portion 121 refers to the average distance from the first surface 6 of the plastic optical component 3 to the first surface 4 of the base member 1 in the optically effective portion 8. The thickness 10 of the second covering portion 122 refers to the average distance from the second surface 7 of the plastic optical component 3 to the second surface 5 of the base member 1 in the optically effective portion 8. The thickness 11 of the base member 1 refers to the maximum thickness thereof in the optically effective portion 8. The surfaces 4 and 5 of the base member 1 can be substantially homothetic to the surfaces 6 and 7 of the plastic optical component 3, respectively. The variation in the distance between the first surface 6 of the plastic optical component 3 and the first surface 4 of the base member 1 is desirably small in the optically effective portion 8. Similarly, the variation in the distance between the second surface 7 of the plastic optical component 3 and the second surface 5 of the base member 1 is desirably small in the optically effective portion 8. The thickness 9 of the first covering portion 121 can be substantially the same as the thickness 10 of the second covering portion 122.

A method for manufacturing the plastic optical component 3 of the present embodiment will be described below. A first, a second and a third plastic are selected such that the second and third plastics have a higher pencil hardness than the first plastic, and such that the first plastic has a lower water absorption than the second and third plastics. Plastics having the same water absorption are selected as the second and third plastics. The base member 1 may be formed of the first plastic by injection molding, extrusion, or pressing. The resulting base member 1 is placed in a mold cavity of an injection die, and the second plastic and the third plastic are fed onto the first and second surfaces 4 and 5 of the base member 1, respectively, to form the covering portions 121 and 122.

Figure 9A:
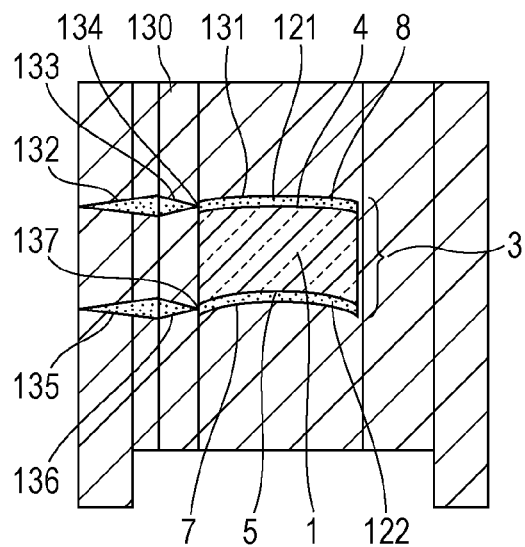
FIGS. 9A to 9D are representations of dies used in an embodiment of the present invention.
Figure 9B:
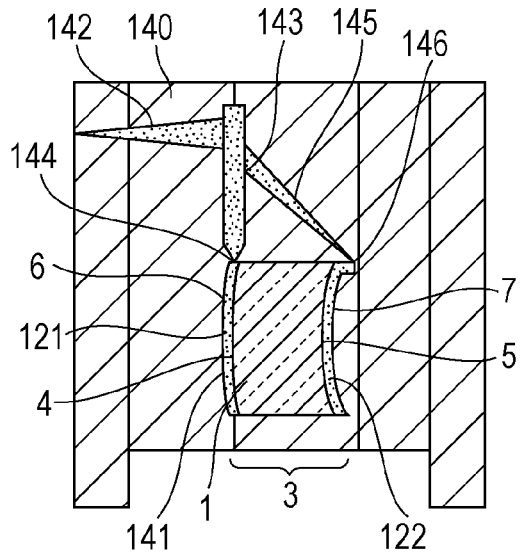

FIG. 9A is a sectional view of an exemplary plastic optical component die used for manufacturing the plastic optical component 3 of the present embodiment. The plastic optical component die 130 has a mold cavity 131. The base member 1 is inserted into the mold cavity 131 of the plastic optical component die 130. Then, the second and third plastics having a higher pencil hardness than the first plastic are injected into the mold cavity 131 through respective sprues 132 and 135, runners 133 and 136, and gates 134 and 137. The first covering portion 121 and the second covering portion 122 are thus formed to complete the plastic optical component 3. FIG. 9B shows another plastic optical component die. This plastic optical component die 140 has a mold cavity 141. The base member 1 is inserted into the mold cavity 141 of the plastic optical component die 140. Then, the second or third plastic having a higher pencil hardness than the first plastic of the base member 1 is injected from a sprue 142 into the mold cavity 141 through runners 143 and 145 diverging from the sprue 142, and gates 144 and 146, thus forming the covering portions 121 and 122 to complete the plastic optical component 3. The plastic optical component 3 is resistant to abrasion and is not much deformed by moisture absorption even though it is thick. In this process, the second plastic and the third plastic are the same material (second plastic). In order to increase the adhesion between the base member 1 and the first and second covering portions 121 and 122, the first and second surfaces 4 and 5 of the base member 1 may be irradiated with a high energy beam. The high energy beam may be, but is not limited to, UV radiation, corona discharge, or plasma discharge. The base member 1 may be integrated with a lens. Such a base member 1 can be formed by feeding a first plastic onto surfaces of a lens placed in a base member die. This process will be described with reference to FIG. 9C. Reference numeral 170 designates the lens in the base member 1. The lens 170 has a first surface 173 and a second surface 174. Reference numeral 160 designates the base member die. The lens 170 is inserted into the mold cavity of the base member die 160. Then, a first plastic is injected into the mold cavity of the base member die 60 from a sprue 162 through runners 163 and 165 diverging from the sprue 162, and gates 164 and 166, thus forming the base member 1. This process can prevent stress from being increased by the difference, which increases as the thickness of the base member 1 is increased, in curing shrinkage between the surface plastic layers 171 and 172 that is first cured in the molding process and the inner plastic portion that is cured late.

One of the surfaces 173 and 174 of the lens 170 is a first surface, and the other is a second surface. Either can be the first or second surface without particular limitation. The lens 170 may be a meniscus lens, a double-convex lens, a concave-concave lens, a plano-convex lens, or a plano-concave lens, and the shape of the lens is not particularly limited. Also, the surfaces of the lens 170 may be spherical, aspherical, or free-form, and the shapes of the surfaces are not particularly limited. The surfaces 4 and 5 of the base member 1 and the surfaces 173 and 174 of the lens 170 can be substantially homothetic to each other. It is advantageous that the distances between the first surface 4 of the base member 1 and the first surface 173 of the lens 170 and between the second surface 5 of the base member 1 and the second surface 174 of the lens 45 are each constant in the optically effective portion.

Third Embodiment

A plastic optical component and a method for manufacturing the plastic optical component will be described according to a third embodiment of the present invention. In the following description, the same parts as in the first or second embodiment are designated by the same reference numerals, and thus description thereof is omitted.

Figure 8A:
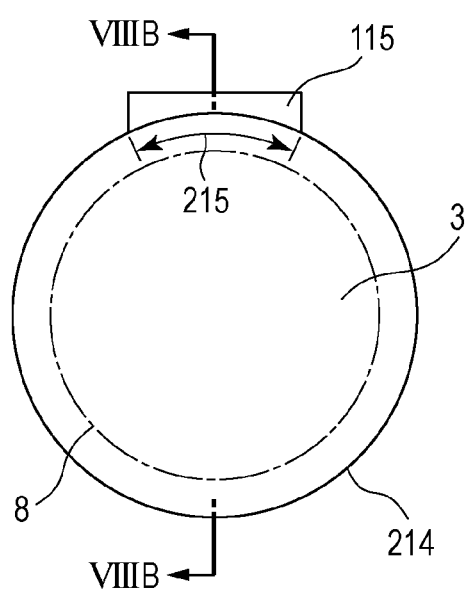
FIGS. 8A and 8B are representations of a plastic optical component according to a third embodiment of the present invention.
Figure 8B:
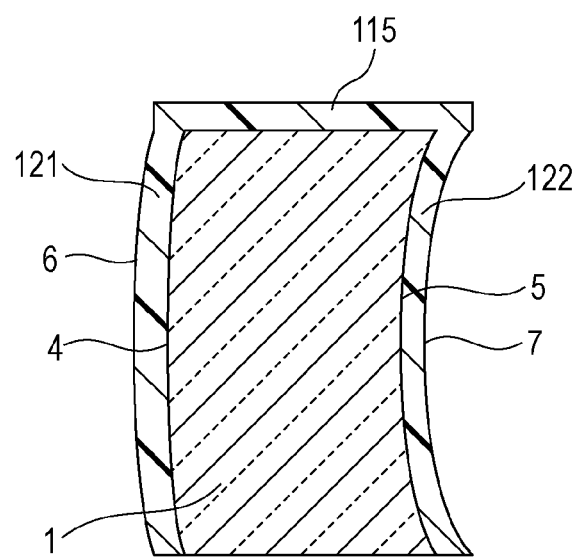

The plastic optical component of the third embodiment has a rib coupling the first covering portion and the second covering portion. FIGS. 8A and 8B are schematic representations of the plastic optical component of the third embodiment. The plastic optical component 3 has a rib 115. The rib 115 has a gate (not shown) through which the second plastic is introduced. This structure reduces the number of cylinders of an injection molding machine used for forming the first covering portion 121 and the second covering portion 122 and allows the use of a die having a simple structure. The side surface, other than the region in which the rib is formed, of the base member 1 is not covered with the covering member or second plastic. This can reduce the moisture deformation of the periphery of the plastic optical component 3. Such a plastic optical component 3 is resistant to abrasion and is not much deformed by moisture absorption even though it is thick. In addition, the plastic optical component can be manufactured at a lower cost. The ratio of the width 215 of the rib 115 to the length of the periphery 214 of the covering member can is preferably in the range of 1/12 to 4/12. More specifically, the ratio of the width 215 of the rib 115 at the portion in contact with the first covering portion 121 to the length of the periphery of the first covering portion 121 (equal to the length of the periphery of the base member 1 adjacent to the first covering portion 121) is set in the range of 1/12 to 4/12. Also, the ratio of the width 215 of the rib 115 at the portion in contact with the second covering portion 122 to the length of the periphery of the second covering portion 122 (equal to the length of the periphery of the base member 1 adjacent to the second covering portion 122) is set in the range of 1/12 to 4/12. By setting this rib/periphery ratio to 1/12 or more, the stress placed on the rib from the covering portions can be reduced even if the first plastic of the base member 1 has a lower glass transition temperature Tg than the second plastic and is thus inferior in heat resistance. Thus, abnormality in appearance can be suppressed. By setting the rib/periphery ratio to 4/12 or less, moisture deformation resulting from the increase in the width 215 of the rib 115 can be suppressed. Such a plastic optical component 3 is resistant to abrasion and is less deformed by moisture absorption, and, in addition, does not exhibit abnormality in appearance, even though it is thick.

Figure 9C:
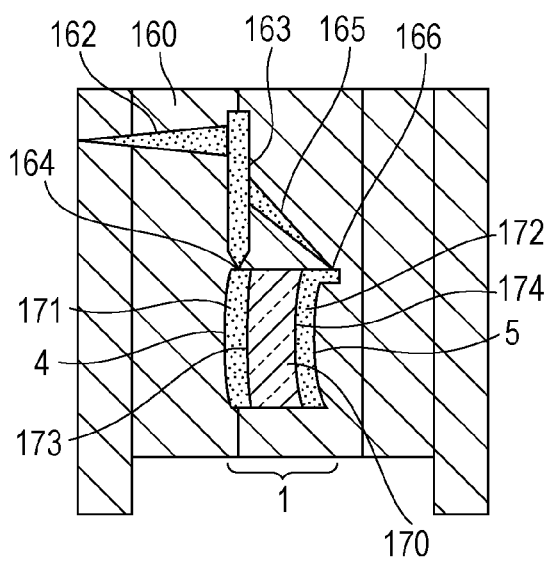
Figure 9D:
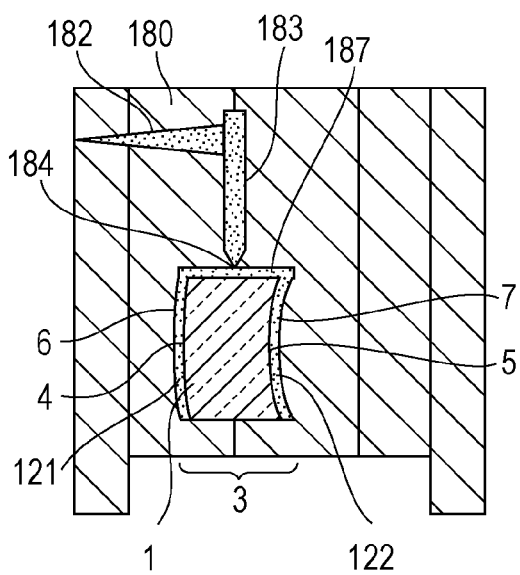

In the method for manufacturing the plastic optical component 3 of the third embodiment, a die is used which has a rib-shaped portion having a shape corresponding to the rib 115 coupling the covering portions 121 and 122 is used. FIG. 9D shows the structure of the die. FIG. 9D is a sectional view of the die. The base member 1 is inserted into the mold cavity of the die (plastic optical component die) 180. Then, a second plastic having a higher pencil hardness than the first plastic of the base member 1 is injected into the mold cavity from a sprue 182 through a runner 183, a gate 184 and the rib-shaped portion 187 to from the first and second covering portions 121 and 122, and thus the plastic optical component 3 is completed. The rib-shaped portion 187 may have a gate 184 through which the second plastic is introduced. Consequently, the number of cylinders of an injection molding machine used for forming the first covering portion 121 and the second covering portion 122 is reduced, and the stricture of the die is simplified. Thus, a thick, abrasion-resistant plastic optical component 3 that is not much deformed by moisture absorption can be manufactured at a low cost. The base member 1 may be integrated with a lens. Such a base member 1 can be formed by feeding a first plastic onto surfaces of a lens placed in a base member die. In this instance, the lens may have a recessed portion that facilitates the feeding of the first plastic onto the surfaces of the lens.

Fourth Embodiment

A plastic optical component and a method for manufacturing the plastic optical component will be described according to a fourth embodiment of the present invention. In the following description, the same parts as in the third embodiment are designated by the same reference numerals, and thus description thereof is omitted. In the fourth embodiment, the base member has a flanged portion that will divide the rib 115 of the third embodiment. In the structure of the third embodiment, the rib 115 coupling the first and second covering portions may be deformed at the root thereof in some cases by moisture absorption.

Figure 11A:
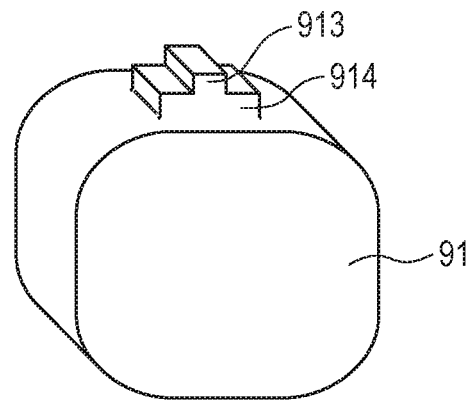
FIGS. 11A to 11C are representations of exemplary base members made of a first plastic, according to a fourth embodiment of the present invention.
Figure 11B:
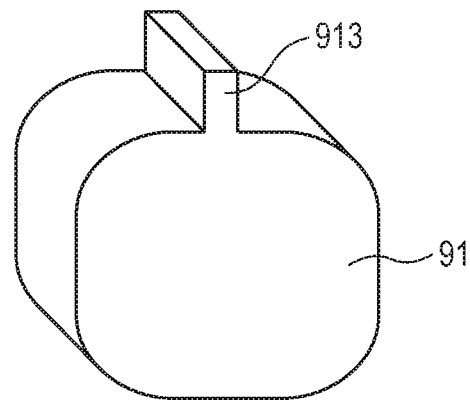
Figure 11C:
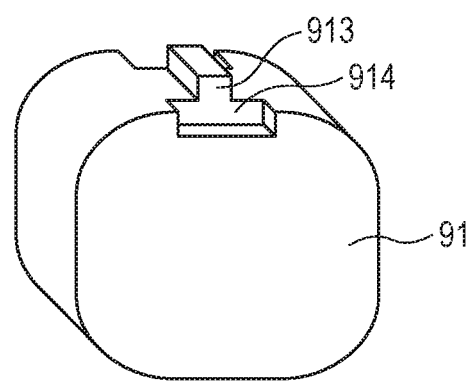
Figure 12C:
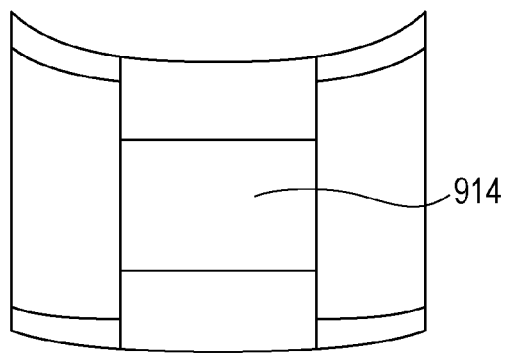
FIGS. 12A to 12C are representations of a plastic optical component according to the fourth embodiment of the present invention.
Figure 12A:
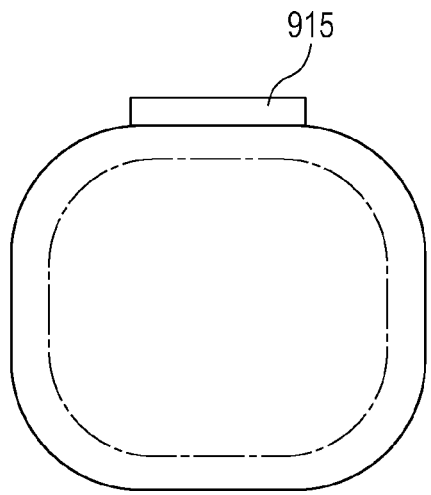
Figure 12B:
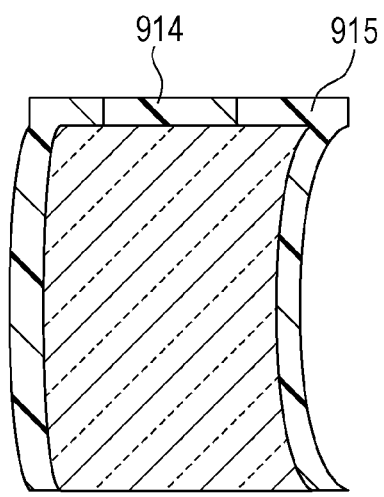

Accordingly, in the fourth embodiment, at least part of the rib is cut off so that the base member made of the first plastic is exposed to separate the first covering portion and the second covering portion. Thus, the deformation that may occur at the root of the rib can be prevented. FIGS. 11A and 11B show exemplary base members made of a first plastic. Each base member 91 has a flanged portion (in a flange shape) including portions 913 and 914. After the covering member is formed, portion 913 is cut off so as to leave portion 914. Thus, the flanged portion is exposed at the rib 915. The rib 915 of the covering member made of the second plastic is thus divided, and the deformation that may occur at the root of the rib can be prevented. Accordingly, the base member 91 is provided with the flanged portion (portions 913 and 914) to divide the rib 915 coupling the first covering portion and the second covering portion. Although the flanged portion is designated by two portions 913 and 914 for the sake of simplifying the description, the flanged portion is desirably formed in one body. FIGS. 12A to 12C show a plastic optical component 3 of the fourth embodiment. The rib 915 is at least partially cut off to expose a part of the flanged portion of the base member 91. Thus, the moisture deformation that may occur around the rib can be reduced. The plastic optical component of the present embodiment is manufactured by substantially the same method as in the third embodiment. Deferent steps will be described below. The base member 1 is placed in the cavity of a plastic optical component die 180 as shown in FIG. 9D in such a manner that the flanged portion is located at the gate 184. The gate 184 is formed at the rib-shaped portion 187, and through which the second plastic is introduced to form the first covering portion 121 and the second covering portion 122. After the second plastic is fed through the gate 184, the portion formed in the gate 184 is cut off. At this time, at least part of the rib of the second plastic is cut off together to expose a part of the flanged portion of the base member 1. Thus at least part of the rib 915 is easily cut off to expose a part of the flanged portion at the rib.

EXAMPLES

Examples 1 to 6, Comparative Examples 1 and 2

FIGS. 5A and 5B show the structure of the plastic optical components prepared in Examples 1 to 6 and Comparative Examples 1 and 2. FIG. 5A is a plan view of the structure, and FIG. 5B is a sectional view of the structure. The same parts as in FIGS. 1 and 2A and 2B are designated by the same reference numerals, and thus description thereof is omitted. Reference numeral 40 designates the external height of each plastic optical component 3, and reference numeral 41 designates the external width of the plastic optical component 3. The plastic optical components were each an oval meniscus lens of 16 mm in height 40 and 18 mm in width 61 and had an optically effective oval portion 8 of 12 mm in height and 14 mm in width, and whose side surface had a draft angle (not shown). The thickness 11 of the base member 1 was 6 mm, and the first thickness 9 and the second thickness 10 of the covering member 2 were each 1 mm. The base member 1 was formed of the corresponding first plastic shown in Table 1. The second plastic of the covering members 2 of Examples 1 to 6 and Comparative Example 1 was poly(methyl methacrylate) containing 1.0 part by weight of 1,2-hydroxy-5-methyl-1-benzotriazole, which can absorb UV light. In Comparative Example 2, polycarbonate was used as the second plastic of the covering member 2. In order to enhance the adhesion between the base member 1 and the covering member 2, the base members 1 of Examples 1, 2, 3 and 6 were irradiated with corona discharge. Then, plastic optical components were prepared in the die shown in FIGS. 3C and 3D. The results of examinations for Examples 1 to 6 and Comparative Examples 1 and 2 are shown in Table 1. The results show that Examples 1 to 6 can achieve thick plastic optical components having high pencil hardnesses and exhibiting small moisture deformation. The plastic optical components 3 of these Examples were thick and resistant to abrasion and were not much deformed by moisture absorption. On the other hand, the optical component of Comparative Example 1 exhibited a large moisture deformation, and the optical component of Comparative Example 2 exhibited a low hardness. Thus these optical components did not satisfy desired properties. For determining the moisture deformation, the surface profile of the plastic optical component was measured with a surface profile analyzer, and subsequently, the plastic optical component was allowed to stand in an atmosphere of 95% in humidity for 240 hours. Then, immediately after the optical component was taken out, the surface profile was measured again. The difference between these surface profiles was defined as the amount of moisture deformation.

TABLE 1

| | First plastic | Pencil hardness | Moisture deformation |
|---|---|---|---|
| Example 1 | Polycarbonate | 2H | 0.8 μm |
| Example 2 | Cycloolefin polymer | 2H | 0.2 μm |
| Example 3 | Cycloolefin-α-olefin copolymer | 2H | 0.2 μm |
| Example 4 | Polystyrene | 2H | 0.3 μm |
| Example 5 | Polystyrene-methyl methacrylate copolymer | 2H | 0.4 μm |
| Example 6 | Fluorene polyester | 2H | 0.8 μm |
| Comparative Example 1 | Poly(methyl methacrylate) | 2H | 1.6 μm |
| Comparative Example 1 | Polycarbonate | 2B | 0.7 μm |

Examples 7 to 14, Comparative Examples 3 and 4

FIGS. 6A and 6B show the structure of the plastic optical components prepared in Examples 7 to 14 and Comparative Examples 3 and 4. The same parts as in FIGS. 1 and 2A and 2B are designated by the same reference numerals, and thus description thereof is omitted. In the figures, reference numeral 48 designates the maximum thickness in the optically effective portion 8 of a lens 45. The plastic optical components were each an oval meniscus lens of 16 mm in height 40 and 18 mm in width 41 and had an optically effective oval portion 8 of 12 mm in height and 14 mm in width, and whose side surface had a draft angle (not shown). Each base member was integrated with a lens 46 made of a first plastic by covering the lens 46 with the first plastic in the die shown in FIGS. 4C and 4D. The thickness 11 of the base member 1 was 12 mm, and the thickness 48 of the lens 45 was 6 mm. The lens had a first surface 46 and a second surface 47. The first plastics used in Examples 7 to 14 and Comparative Examples 3 and 4 are shown in Table 2. The second plastic used in Examples 7 to 14 and Comparative Example 3 was poly(methyl methacrylate). In Comparative Example 4, polycarbonate was used as the second plastic. In order to enhance the adhesion between the base member 1 and the covering member 2, the base members of Examples 7, 8, 9, 12 and 13 were irradiated with corona discharge. After forming the base member 1 in the die shown in FIGS. 4C and 4D, the plastic optical component 3 was prepared in the die shown in FIGS. 3C and 3D. Table 2 shows the material of the first plastic, the thickness and pencil hardness of the covering member, and the moisture deformation, for each of the Examples and Comparative Examples. The results show that the combinations of Examples 7 to 14 can achieve thick plastic optical components having high pencil hardnesses and exhibiting small moisture deformation. The plastic optical components 3 of these Examples were thick and resistant to abrasion and were not much deformed by moisture absorption. On the other hand, the optical component of Comparative Example 3 exhibited a large moisture deformation, and the optical component of Comparative Example 4 exhibited a low hardness. Thus these optical components did not satisfy desired properties.

TABLE 2

| | First plastic | Thickness 9, 10 | Pencil hardness | Moisture deformation |
|---|---|---|---|---|
| Example 7 | Polycarbonate | 1 mm | 2H | 0.9 μm |
| Example 8 | Cycloolefin polymer | 1 mm | 2H | 0.1 μm |
| Example 9 | Cycloolefin-α-olefin copolymer | 1 mm | 2H | 0.1 μm |
| Example 10 | Polystyrene | 1 mm | 2H | 0.1 μm |
| Example 11 | Polystyrene-methyl methacrylate copolymer | 1 mm | 2H | 0.3 μm |
| Example 12 | Fluorene polyester | 1 mm | 2H | 0.9 μm |
| Example 13 | Cycloolefin polymer | 3 mm | 2H | 0.2 μm |
| Example 14 | Polystyrene-methyl methacrylate copolymer | 3 mm | 2H | 0.5 μm |
| Comparative Example 3 | Poly(methyl methacrylate) | 1 mm | 2H | 3.1 μm |
| Comparative Example 4 | Polycarbonate | 1 mm | 2B | 0.9 μm |

Examples 15 to 20, Comparative Examples 5 and 6

The plastic optical components prepared in Examples 15 to 20 and Comparative Examples 5 and 6 were each an oval meniscus lens 16 mm in height and 18 mm in width and had an optically effective oval portion of 12 mm in height and 14 mm in width, and whose side surface had a draft angle. Each plastic optical component includes a 6 mm thick base member 1 made of a first plastic, a 1 mm thick first covering portion made of a second plastic, and a 1 mm thick second covering portion made of a third plastic. The first plastics used are shown in Table 3. The second and third plastics used in Examples 15 to 20 and Comparative Example 5 were each poly(methyl methacrylate) containing 1.0 part by weight of 1,2-hydroxy-5-methyl-1-benzotriazole, which can absorb UV light. In Comparative Example 6, polycarbonate was used as the second and third plastics. In order to enhance the adhesion between the base member 1 and the covering member, the base members of Examples 15, 16, 17 and 18 were irradiated with corona discharge. Then, plastic optical components were prepared in the die shown in FIG. 9B. Table 3 shows the pencil hardness and moisture deformation of each plastic optical component. The results show that Examples 15 to 20 can achieve thick plastic optical components having high pencil hardnesses and exhibiting small moisture deformation. The plastic optical components 3 of these Examples were thick and resistant to abrasion and were not much deformed by moisture absorption. On the other hand, the optical component of Comparative Example 5 exhibited a large moisture deformation, and the optical component of Comparative Example 6 exhibited a low hardness. Thus these optical components did not satisfy desired properties.

TABLE 3

| | First plastic | Water absorption | Pencil hardness | Moisture deformation |
|---|---|---|---|---|
| Example 15 | Polycarbonate | 0.2% | 2H | 0.8 μm |
| Example 16 | Cycloolefin polymer | 0.01% | 2H | 0.2 μm |
| Example 17 | Cycloolefin-α-olefin copolymer | 0.01% | 2H | 0.2 μm |
| Example 18 | Polystyrene | 0.04% | 2H | 0.3 μm |
| Example 19 | Polystyrene-methyl methacrylate copolymer | 0.1% | 2H | 0.5 μm |

TABLE 3-continued

| | First plastic | Water absorption | Pencil hardness | Moisture deformation |
|---|---|---|---|---|
| Example 20 | Fluorene polyester | 0.2% | 2H | 0.8 μm |
| Comparative Example 5 | Poly(methyl methacrylate) | 0.3% | 2H | 1.6 μm |
| Comparative Example 6 | Polycarbonate | 0.2% | 2B | 0.7 μm |

Examples 21 to 24, Comparative Examples 7 to 10

The plastic optical components prepared in Examples 21 to 24 and Comparative Examples 7 to 10 were each an oval meniscus lens of 16 mm in height and 18 mm in width and had an optically effective oval portion of 12 mm in height and 14 mm in width, and whose side surface had a draft angle (not shown). The base member, which was integrated with a lens, was prepared by feeding a first plastic onto a first surface and a second surface of the lens placed in a base member die, as shown in FIG. 9C. Each plastic optical component included the base member having a thickness of 6 mm and containing the lens having a thickness of 6 mm, a first covering portion made of a second plastic, and a second covering portion made of a third plastic. The thicknesses of the first covering portion and the second covering portion were the same. The first plastics used are shown in Table 4. The second and third plastics used in Examples 21 to 24 and Comparative Examples 7 and 9 were each poly(methyl methacrylate). In Comparative Examples 8 and 10, a cycloolefin polymer was used as the second and third plastics. In order to enhance the adhesion between the base member and the covering member, the base members of Examples 21 and 23 were irradiated with corona discharge. Then, plastic optical components were prepared in the die shown in FIG. 9B. Table 4 shows the water absorption, the thickness of the first and second covering portions, the pencil hardness and the moisture deformation of each sample. The results show that Examples 21 to 24 can achieve thick plastic optical components having high pencil hardnesses and exhibiting small moisture deformation. The plastic optical components of these Examples were thick and resistant to abrasion and were not much deformed by moisture absorption. On the other hand, the optical components of Comparative Examples 7 and 9 exhibited large moisture deformation, and the optical components of Comparative Examples 8 and 10 exhibited low hardnesses. Thus these optical components did not satisfy desired properties.

TABLE 4

| | First plastic | Water absorption | Thickness | Pencil hardness | Moisture deformation |
|---|---|---|---|---|---|
| Example 21 | Cycloolefin polymer | 0.01% | 0.5 mm | 2H | 0.1 μm |
| Example 22 | Polystyrene-methyl methacrylate copolymer | 0.1% | 0.5 mm | 2H | 0.5 μm |
| Example 23 | Cycloolefin polymer | 0.01% | 3.0 mm | 2H | 0.3 μm |
| Example 24 | Polystyrene-methyl methacrylate copolymer | 0.1% | 3.0 mm | 2H | 0.6 μm |
| Comparative Example 7 | Poly(methyl methacrylate) | 0.3% | 0.5 mm | 2H | 2.5 μm |
| Comparative Example 8 | Cycloolefin polymer | 0.01% | 0.5 mm | F | 0.1 μm |
| Comparative Example 9 | Poly(methyl methacrylate) | 0.3% | 3.0 mm | 2H | 3.3 μm |
| Comparative Example 10 | Cycloolefin polymer | 0.01% | 3.0 mm | F | 0.1 μm |

Examples 25 to 30, Comparative Examples 11 and 12

Plastic optical components were prepared according to the third embodiment. Each optical component had an oval shape of 16 mm in height and 18 mm in width and was provided with a rib having a width of 9 mm. The plastic optical component was a meniscus lens having an optically effective oval portion of 12 mm in height and 14 mm in width, and whose side surface had a draft angle. The plastic optical component included the base member having a thickness of 12 mm and containing a lens having a thickness of 6 mm, a first covering portion having a thickness of 1 mm, and a second covering portion having a thickness of 1 mm. The first plastics used are shown in Table 5. The second plastics used in Examples 25 to 30 and Comparative Example 11 were each poly(methyl methacrylate). In Comparative Example 12, polycarbonate was used as the second plastic. In order to enhance the adhesion between the base member 1 and the covering member, the base members of Examples 25, 26, 27 and 30 were irradiated with corona discharge. Then, plastic optical components were prepared in the die shown in FIG. 9D. Table 5 shows the water absorption, the pencil hardness and the moisture deformation of each sample. The results show that Examples 25 to 30 can achieve thick plastic optical components having high pencil hardnesses and exhibiting small moisture deformation. The plastic optical components of these Examples were thick and resistant to abrasion and were not much deformed by moisture absorption. On the other hand, the optical component of Comparative Example 11 exhibited a large moisture deformation, and the optical component of Comparative Example 12 exhibited a low hardness. Thus these optical components did not satisfy desired properties.

TABLE 5

|  | First plastic | Water absorption | Pencil hardness | Moisture deformation |
|---|---|---|---|---|
| Example 25 | Polycarbonate | 0.2% | 2H | 0.9 μm |
| Example 66 | Cycloolefin polymer | 0.01% | 2H | 0.1 μm |
| Example 27 | Cycloolefin-α-olefin copolymer | 0.01% | 2H | 0.1 μm |
| Example 28 | Polystyrene | 0.04% | 2H | 0.3 μm |
| Example 29 | Polystyrene-methyl methacrylate copolymer | 0.1% | 2H | 0.5 μm |
| Example 30 | Fluorene polyester | 0.2% | 2H | 0.9 μm |
| Comparative Example 11 | Poly(methyl methacrylate) | 0.3% | 2H | 2.7 μm |
| Comparative Example 12 | Polycarbonate | 0.2% | 2B | 0.9 μm |

Examples 31 to 40, Comparative Examples 13 to 16

Figure 10C:
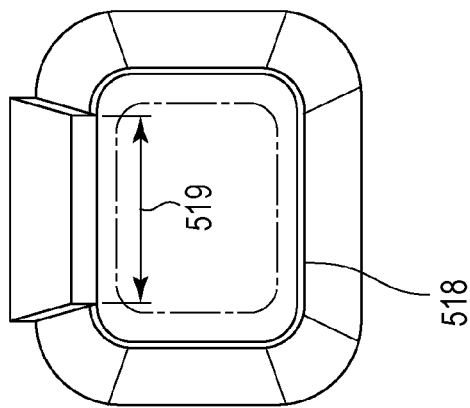
FIGS. 10A to 10C are representations of a plastic optical component prepared in an Example of the present invention.
Figure 10B:
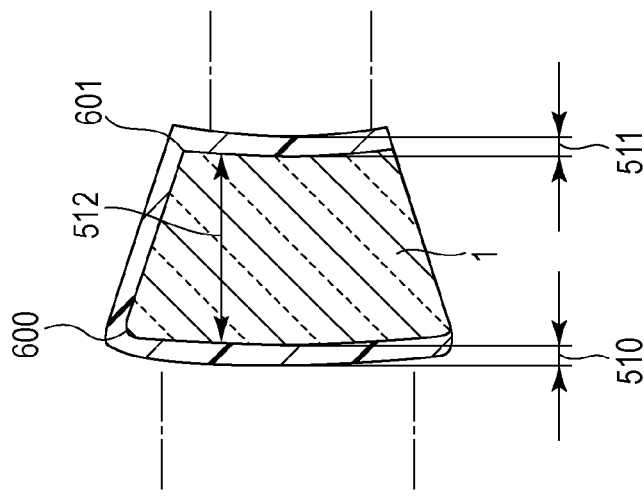
Figure 10A:
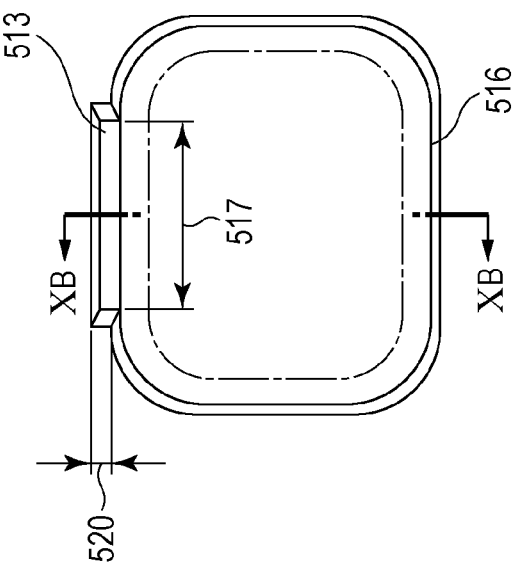

Plastic optical components shown in FIGS. 10A to 10C were prepared. Reference numeral 516 designates the periphery of the first covering portion, reference numeral 517 designates the width of the rib at the portion in contact with the first covering portion, reference numeral 518 designates the periphery of the second covering portion, and reference numeral 519 designates the width of the rib at the portion in contact with the second covering portion. Also, reference numeral 520 designates the height of the rib that was 1 mm. The second plastic of the covering member (first covering portion and second covering portion) was poly(methyl methacrylate) containing 1.0 part by weight of 1,2-hydroxy-5-methyl-1-benzotriazole, which can absorb UV light. In Examples 31 to 38 and Comparative Examples 13 and 14, the first plastic of the base member 1 was a styrene-methyl methacrylate copolymer having a lower glass transition temperature Tg than poly(methyl methacrylate). In Examples 39 and 40 and Comparative Examples 15 and 16, styrene, which has a lower glass transition temperature than poly(methyl methacrylate), was used as the first plastic. Table 6 shows the thicknesses 510 and 511 of the first and second covering portions and the thickness 512 of the base member. Table 6 also show the length of the periphery 516 of the first covering portion, the width 517 of the rib at the portion in contact with the first covering portion, the length of the periphery 518 of the second covering portion, the width 519 of the rib at the portion in contact with the second covering portion, and the ratios of the widths of the rib to the lengths of the peripheries. The results of examinations for abnormality in appearance and moisture deformation are also shown in Table 6. The results show that Examples 31 to 40 can achieve thick plastic optical components having high pencil hardnesses and exhibiting small moisture deformation, and, in addition, having good appearance. On the other hand, in Comparative Examples 13 and 15, abnormality in appearance was observed at the rib. In FIGS. 10A to 10C, reference numerals 600 and 601 designate portions at which the second plastic extending from the rib is curved to reach the surfaces of the plastic optical component. The plastic optical component is formed by feeding a melt of the second plastic onto the base member 1 through a portion where the rib will be formed, and solidifying the second plastic. When the melt of the second plastic is solidified, the highest stress occurs at portions 600 and 601 at which the plastic fed from the rib portion is curved to reach the surfaces of the optical component. Consequently, the base member is deformed at the portions 600 and 601. Probably, this is the cause of appearance abnormality. In Comparative examples 14 and 16, abnormality in appearance was not observed at the rib, but the moisture deformation was large. Table 7 shows the results of environmental test performed for adhesion strength on the samples of Examples 31 and 39. In the sample of Example 39, a small separation was observed in Environmental Test B, but was acceptable. The results suggest that the material combination of Example 31 can achieve a plastic optical component having higher adhesion. In Environmental Test A, the samples were allowed to stand at a temperature of 80° C. for 240 hours. In Environmental Test B, the samples were allowed to stand at a temperature of 80° C. and a humidity of 95% for 240 hours.

TABLE 6

|  | Thickness 510, 511 | Periphery 516, 518 | Width 517, 519 | Width/Periphery ratio | Appearance abnormality | Moisture deformation |
|---|---|---|---|---|---|---|
| Example 31 | 1 mm | 72 mm | 6 mm | 1/12 | None | 0.5 μm |
| Example 32 | 1 mm | 72 mm | 9 mm | 1.5/12 | None | 0.5 μm |
| Example 33 | 1 mm | 36 mm | 8 mm | 2.7/12 | None | 0.7 μm |
| Example 34 | 1 mm | 36 mm | 12 mm | 4/12 | None | 0.7 μm |
| Example 35 | 3 mm | 72 mm | 6 mm | 1/12 | None | 0.8 μm |
| Example 36 | 3 mm | 36 mm | 12 mm | 4/12 | None | 0.9 μm |
| Example 37 | 0.5 mm | 72 mm | 6 mm | 1/12 | None | 0.5 μm |
| Example 38 | 0.5 mm | 36 mm | 12 mm | 4/12 | None | 0.7 μm |
| Example 39 | 1 mm | 72 mm | 6 mm | 1/12 | None | 0.3 μm |
| Example 40 | 1 mm | 36 mm | 12 mm | 4/12 | None | 0.6 μm |
| Comparative Example 13 | 1 mm | 72 mm | 3 mm | 0.5/12 | Occurred | 0.5 μm |
| Comparative Example 14 | 1 mm | 36 mm | 15 mm | 5/12 | None | 1.9 μm |
| Comparative Example 15 | 1 mm | 72 mm | 3 mm | 0.5/12 | Occurred | 0.3 μm |
| Comparative Example 16 | 1 mm | 36 mm | 15 mm | 5/12 | None | 1.5 μm |

TABLE 7

|  | Separation after Environmental Test A | Separation after Environmental Test B |
|---|---|---|
| Example 31 | None | None |
| Example 39 | None | Occurred |

Thus, an embodiment of the present invention provides a thick abrasion-resistant plastic optical component that is not much deformed by moisture absorption, and a method for manufacturing such a plastic optical component.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-117751 filed May 23, 2012 and No. 2013-091425 filed Apr. 24, 2013, which are hereby incorporated by reference herein in its entirety.

What is claimed is:

1. A plastic optical component comprising:
a base member made of a first plastic;
a covering member disposed on a surface of the base member, the covering member made of a second plastic,
wherein a water absorption of the first plastic is lower than a water absorption of the second plastic, and a hardness of the second plastic is higher than a hardness of the first plastic,
wherein the water absorption of the first plastic is in a range of 0.01% to 0.2% and
wherein the difference in water absorption between the first plastic and the second plastic is 0.3% or less,
wherein the second plastic is a resin containing poly(m-ethyl methacrylate) or hard silicone resin,
wherein the base member is formed by covering a lens made of the first plastic with the first plastic;
wherein the base member has a first surface and a second surface, and the covering member includes a first covering portion disposed on the first surface, a second covering portion disposed on the second surface, or the first covering portion and the second covering portion; and
wherein the first covering portion or the second covering portion is made of a third plastic, and wherein the water absorption of the first plastic is lower than the water absorption of the third plastic.

2. The plastic optical component according to claim 1, further comprising a rib coupling the first covering portion and the second covering portion.

3. The plastic optical component according to claim 2, wherein the rib has widths at a portion in contact with the first covering portion and a portion in contact with the second covering portion, the width at the portion in contact with the first covering portion being in the range of 1/12 to 4/12 relative to the length of the periphery of the first covering portion, the width at the portion in contact with the second covering portion being in the range of 1/12 to 4/12 relative to the length of the periphery of the second covering portion.

4. The plastic optical component according to claim 2, wherein the base member has a flanged portion.

5. The plastic optical component according to claim 2, wherein at least part of the rib is cut to separate the first covering portion and the second covering portion.

6. The plastic optical component according to claim 1, wherein the first plastic is a resin containing polycarbonate, a cycloolefin polymer, a copolymer of cycloolefin and α-olefin, styrene, polystyrene, a copolymer of styrene and methyl methacrylate, or fluorene polyester.

7. The plastic optical component according to claim 1, wherein the second plastic has a pencil hardness of 2H or higher.

8. The plastic optical component according to claim 1, wherein the covering member has a thickness in the range of 0.5 to 3 mm.

9. The plastic optical component according to claim 1, wherein the second plastic contains an additive that can absorb UV light.

10. The plastic optical component according to claim 9, wherein the additive is a benzotriazole compound, a benzophenone compound, or a triazine compound.

11. The plastic optical component according to claim 9, wherein the additive content is 0.1 to 5 parts by weight.

12. A plastic optical component comprising:
a base member made of a first plastic;
a covering member disposed on a surface of the base member, the covering member made of a second plastic,
wherein a water absorption of the first plastic is lower than a water absorption of the second plastic, and a hardness of the second plastic is higher than a hardness of the first plastic,
wherein the water absorption of the first plastic is in a range of 0.01% to 0.2%, and
wherein the difference in water absorption between the first plastic and the second plastic is 0.3% or less,
wherein the second plastic is a resin containing poly(m-ethyl methacrylate) or hard silicone resin,
wherein the base member is formed by covering a lens made of the first plastic with the first plastic;
wherein the base member has a first surface and a second surface, and the covering member includes a first covering portion disposed on the first surface and a second covering portion disposed on the second surface; and
a rib coupling the first covering portion and the second covering portion,
wherein the rib has widths at a portion in contact with the first covering portion and a portion in contact with the second covering portion, the width at the portion in contact with the first covering portion being in the range of 1/12 to 4/12 relative to the length of the periphery of the first covering portion, the width at the portion in contact with the second covering portion being in the range of 1/12 to 4/12 relative to the length of the periphery of the second covering portion.

13. The plastic optical component according to claim 12, wherein the first covering portion or the second covering portion is made of a third plastic, and wherein the water absorption of the first plastic is lower than the water absorption of the third plastic.

14. The plastic optical component according to claim 12, wherein the base member has a flanged portion.

15. The plastic optical component according to claim 12, wherein at least part of the rib is cut to separate the first covering portion and the second covering portion.

16. The plastic optical component according to claim 12, wherein the first plastic is a resin containing polycarbonate, a cycloolefin polymer, a copolymer of cycloolefin and α-olefin, styrene, polystyrene, a copolymer of styrene and methyl methacrylate, or fluorene polyester.

17. The plastic optical component according to claim 12, wherein the second plastic has a pencil hardness of 2H or higher.

18. The plastic optical component according to claim 12, wherein the covering member has a thickness in the range of 0.5 to 3 mm.

19. The plastic optical component according to claim 12, wherein the second plastic contains an additive that can absorb UV light.

20. The plastic optical component according to claim 19, wherein the additive is a benzotriazole compound, a benzophenone compound, or a triazine compound.

21. The plastic optical component according to claim 19, wherein the additive content is 0.1 to 5 parts by weight.

22. A plastic optical component comprising:
a base member made of a first plastic;
a covering member disposed on a surface of the base member, the covering member made of a second plastic,
wherein a water absorption of the first plastic is lower than a water absorption of the second plastic, and a hardness of the second plastic is higher than a hardness of the first plastic,
wherein the water absorption of the first plastic is in a range of 0.01% to 0.2%, and
wherein the difference in water absorption between the first plastic and the second plastic is 0.3% or less,
wherein the second plastic is a resin containing poly(methyl methacrylate) or hard silicone resin,
wherein the base member is formed by covering a lens made of the first plastic with the first plastic;
wherein the base member has a first surface and a second surface, and the covering member includes a first covering portion disposed on the first surface and a second covering portion disposed on the second surface; and
a rib coupling the first covering portion and the second covering portion,
wherein at least part of the rib is cut to separate the first covering portion and the second covering portion.

* * * * *